United States Patent
Ishizuka

(10) Patent No.: US 8,228,508 B2
(45) Date of Patent: Jul. 24, 2012

(54) ORIGIN DETECTION APPARATUS, DISPLACEMENT MEASUREMENT APPARATUS AND OPTICAL APPARATUS

(75) Inventor: Ko Ishizuka, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 244 days.

(21) Appl. No.: 12/702,667

(22) Filed: Feb. 9, 2010

(65) Prior Publication Data

US 2010/0208271 A1    Aug. 19, 2010

(30) Foreign Application Priority Data

Feb. 13, 2009    (JP) .................. 2009-031396

(51) Int. Cl.
*G01B 11/02*    (2006.01)
(52) U.S. Cl. ...................................................... 356/499
(58) Field of Classification Search .................. 356/499
See application file for complete search history.

(56) References Cited

U.S. PATENT DOCUMENTS

| | | | | |
|---|---|---|---|---|
| 5,663,794 A | * | 9/1997 | Ishizuka | 356/499 |
| 5,808,742 A | * | 9/1998 | Everett et al. | 356/509 |
| 6,229,140 B1 | * | 5/2001 | Ishizuka | 250/237 G |
| 6,429,940 B1 | * | 8/2002 | Willhelm | 356/499 |
| 6,879,405 B2 | | 4/2005 | Tamiya | |
| 7,034,948 B2 | | 4/2006 | Tamiya | |
| 7,608,813 B1 | * | 10/2009 | Milvich et al. | 250/231.13 |

FOREIGN PATENT DOCUMENTS

| JP | 2004-144581 A | 5/2004 |
|---|---|---|
| JP | 2004-170153 A | 6/2004 |

* cited by examiner

*Primary Examiner* — Tarifur Chowdhury
*Assistant Examiner* — Jonathon Cook
(74) *Attorney, Agent, or Firm* — Canon U.S.A., Inc. IP Division

(57) ABSTRACT

An apparatus includes a light source, a scale which is configured to have first and second diffraction grating portions which differ from each other in a grating pitch, a light receiving portion configured to receive first and second interference light fluxes generated from interference of a plurality of diffraction light fluxes, at the first and second diffraction grating portions, respectively, a light flux emitted from the light source and have different orders of diffraction, and to output first and second periodic signals based on an intensity of the first and second interference light fluxes, respectively, and a computing unit configured to output, based on the first and second periodic signals a signal representing an origin of displacement of the scale.

12 Claims, 20 Drawing Sheets

MAX-MIN (D12) CAUSED BY GT1 AND GT2

MAX-MIN (D12) CAUSED BY GT1 AND GT2

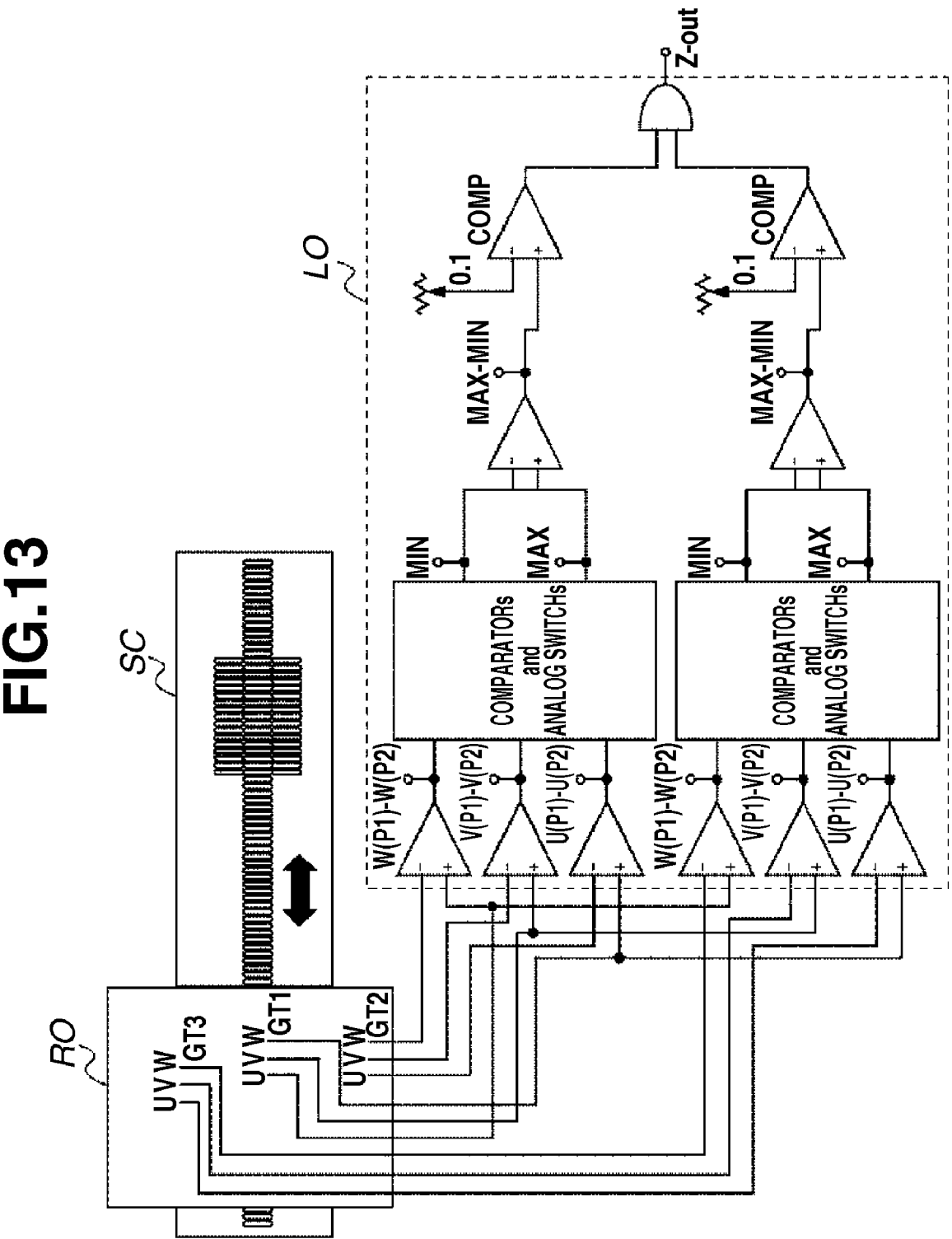

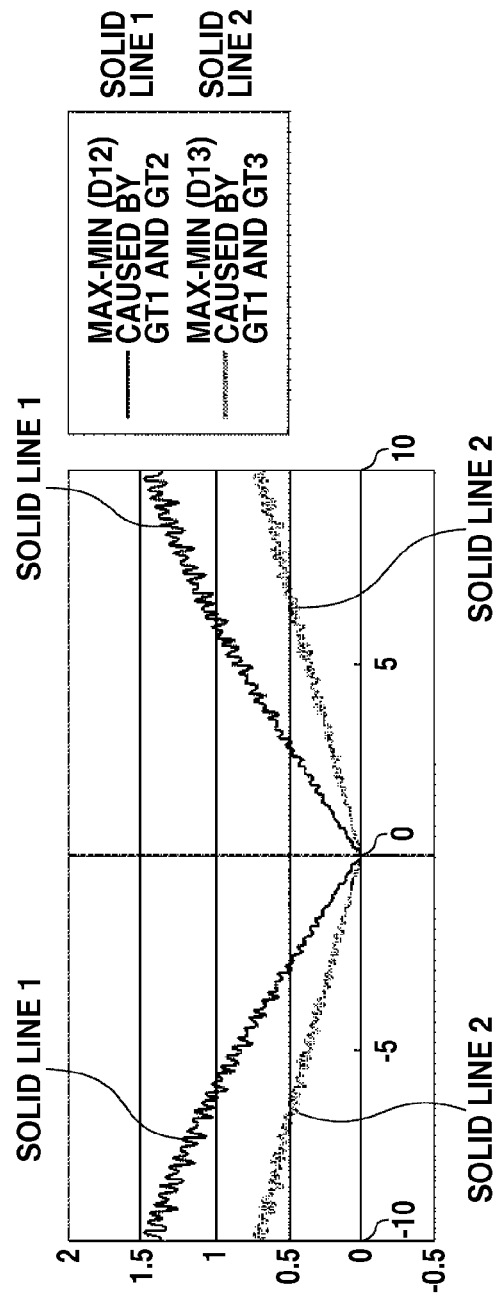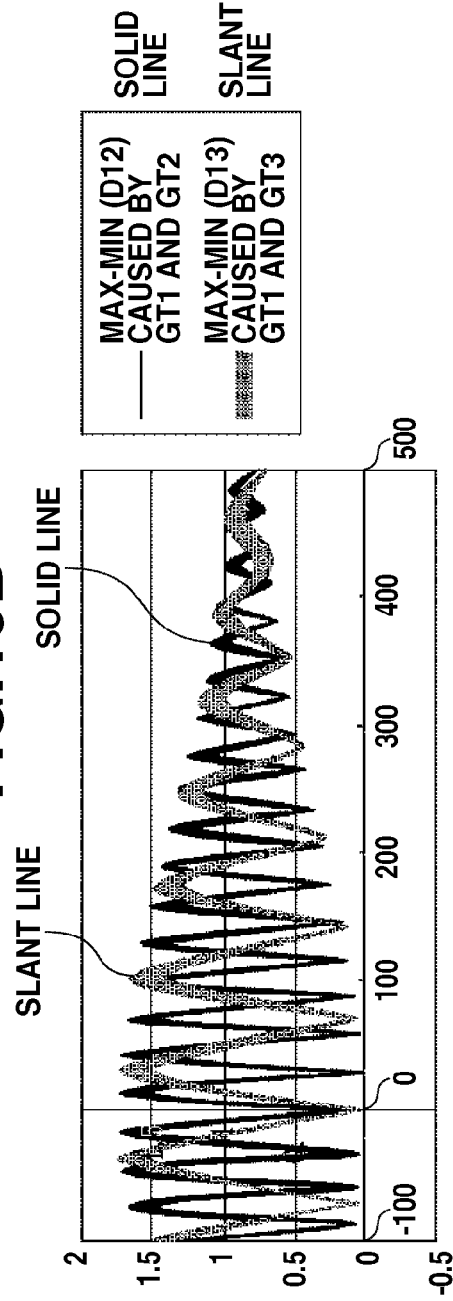

REGION SIGNAL OF D13

REGION SIGNAL OF D13

ORIGIN DETECTION APPARATUS, DISPLACEMENT MEASUREMENT APPARATUS AND OPTICAL APPARATUS

BACKGROUND OF THE INVENTION

1. Field of the Invention

The present invention relates to a device for acquiring information about displacement of an object. More particularly, the present invention relates to a device for detecting an origin serving as a reference position for counting the number of the periodic signals.

2. Description of the Related Art

Recently, a diffraction interference type encoder which measures a displacement of an object by measuring interference light generated from a plurality of orders of diffraction light diffracted by scales that relatively move has been used as a device for measuring a relative displacement of a mechanical stage or the like at a resolution of the order of sub-microns.

When a diffraction interference type encoder performs position measurement, it is generally performed that an origin (reference position) for a signal output from the encoder is detected, then a value of a counter is reset to zero, and an absolute position signal is output. Hitherto, detection of an origin is performed by the following methods. A first method is of obtaining an origin signal by illuminating a slit-like pattern with a converged light flux and generating a reflected light flux from the slit-like pattern like a pulse. A second method is of providing a plurality of slit arrays arranged at unequal intervals, irradiating light fluxes thereon to obtain patterns same as the slit arrays, collectively detecting reflection light, and generating a sharp pulse-like signal at a moment when patterns of a reflection portion of the slit arrays match contrast distribution patterns of the illumination light to the slit arrays, thereby obtaining an origin signal. A third method is of providing gratings with different periodical pitches side by side, generating a plurality of signals with different signal periods, and generating an origin signal at a position at which a phase difference among a plurality of signals is a predetermined value (e.g., zero). Japanese Patent Application Laid-Open Nos. 2004-144581 and 2004-170153 discuss the third method.

However, detection principles of the first and second methods utilize variation in amount of light due to geometrical optical blocking of a light flux. Thus, reproducibility of a pulse-like signal is several microns (μm) at most. Consequently, accuracy is insufficient for detecting an origin of a diffraction interference type encoder that outputs periodic signals having a period of the order of sub-microns.

The third method can provide higher detection accuracy than the first and second methods. However, the signal period of the diffraction interference type encoder is particularly short. Thus, a plurality of positions at which the phase difference among signals has a predetermined value is contiguously generated. Consequently, no origin can be identified. Accordingly, the third method is difficult to be put to practical use. Japanese Patent Application Laid-Open No. 2004-170153 discusses the following method as means for resolving this matter. According to the method, periodicity of a sine wave is changed among positions at which the phase difference between a plurality of signals is a predetermined value. Then, a position at which the periodicity has a value associated with an origin is detected. Thus, an origin is identified.

According to the method discussed in Japanese Patent Application Laid-Open No. 2004-170153, the interval between the positions at which the phase difference has the predetermined value is counted and stored by a counter. An origin signal is determined according to a state of the counted intervals. In this procedure, an analog signal output from a light receiving portion is to be converted into a digital signal by an analog-to-digital (AD) converter or the like, and then the digital signal can be processed. In addition, the digital signal is counted using a counter or the like, so that a calculation operation is complex. In such a calculation operation, calculation functions of a field programmable gate array (FPGA), a digital signal processor (DAP), a central processing unit (CPU) or the like, counters, and clock signals are to be obtained. In addition, it is difficult to detect an origin at high speed.

SUMMARY OF THE INVENTION

According to an aspect of the present invention, an apparatus includes a light source, a scale configured to have first and second diffraction grating portions which differ from each other in a grating pitch, a light receiving portion configured to receive first and second interference light fluxes generated from interference of a plurality of diffraction light fluxes, at the first and second diffraction grating portions, respectively, a light flux emitted from the light source and have different orders of diffraction, and to output first and second periodic signals based on an intensity of the first and second interference light fluxes, respectively, and a computing unit configured to output, based on the first and second periodic signals, a signal representing an origin of displacement of the scale.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 13 is a circuit diagram illustrating a computing unit of the origin detection apparatus according to the second exemplary embodiment of the present invention.

FIGS. 16A and 16B are waveform charts illustrating waveforms of signals representing a difference between a value of a phase in which the difference between the first and second periodic signals is maximized, and that of a phase in which the difference therebetween is minimized, and a difference between a value of a phase in which the difference between the first and third periodic signals is maximized, and that of a phase in which the difference therebetween is minimized.

DESCRIPTION OF THE EMBODIMENTS

Figure 1:
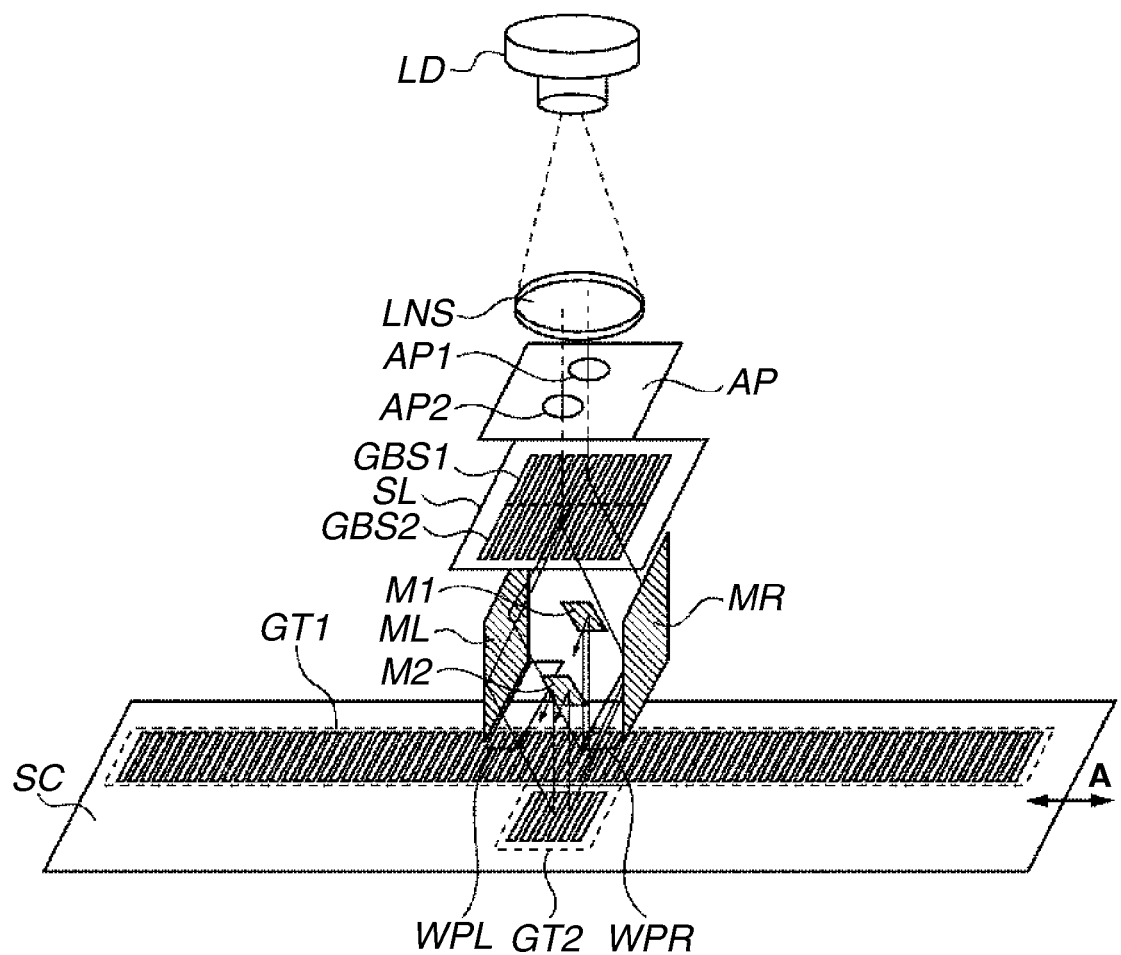
FIG. 1 is a schematic diagram illustrating a configuration of an origin detection apparatus according to a first exemplary embodiment of the present invention.

Various exemplary embodiments, features, and aspects of the invention will be described in detail below with reference to the drawings.

An origin detection apparatus according to an exemplary embodiment of the present invention includes a light source, a scale including a diffraction grating portion that is relatively movable with respect to the light source, a light receiving portion configured to receive interference light fluxes obtained by the interference among a plurality of diffraction light fluxes diffracted by the scale to have different orders of diffraction, and a computing unit configured to output an origin signal based on a signal output from the light receiving portion.

The scale has a first diffraction grating portion and a second diffraction grating portion that differ from in grating pitch. In each of the first and second diffraction grating portions, a slit pattern which is constituted by a reflection part and a non-reflection part and a slit pattern which is constituted by a transmitting part and a non-transmitting part are periodically and alternately formed. More specifically, each of the first and second diffraction grating portions can be either a reflection type diffraction grating or a transmission type diffraction grating. The first and second diffraction grating portions are formed such that arrangement directions of gratings thereof are parallel to each other. Light emitted from the light source is transmitted through the first diffraction grating portion to be split into a plurality of diffraction light fluxes respectively having different orders of diffraction. Optical paths of a part of the diffraction light fluxes overlap with one another to generate a first interference light flux. On the other hand, similarly, the optical paths of a part of diffraction light fluxes obtained by splitting a light flux which is emitted from the light source and transmitted through the second diffraction grating portion, overlap with one another. Thus, a second interference light flux is obtained.

A position to be set as an origin of the scale is preliminarily set as a position at which the slit patterns constituting the first and second diffraction grating portions which are adjacent to each other have a predetermined positional relationship. The predetermined positional relationship is, e.g., that in which centers of the slit patterns of the first and second diffraction grating portions in the arrangement direction of the grating coincide with each other.

The light receiving portion receives the first and the second interference light fluxes and outputs a first interference signal based on an intensity of the first interference light flux, and a second interference signal based on an intensity of the second interference light flux.

The computing unit outputs a signal indicating an origin of displacement of the scale based on the first and second interference signals.

Because the first and second diffraction grating portions differ from each other in the grating pitch, there is a plurality of positions at each of which the slit patterns constituting the first and second diffraction grating portions adjacent to each other have the predetermined positional relationship, in addition to the origin. Therefore, the origin cannot be identified only by detecting the positions at each of which the slit patterns constituting the first and second diffraction grating portions adjacent to each other have the predetermined positional relationship, i.e., the position at which the phase difference between the first and second interference signals is a predetermined value.

Thus, in the origin detection apparatus according to the exemplary embodiment of the present invention, the second interference signal is set to have an extremal value when the scale is located at the origin. Accordingly, the computing unit can identify the origin by measuring a position at which the phase difference between the first and second interference signals is the predetermined value, and at which the second interference signal has the extremal value.

The extremal value can be any of a maximum value, a minimum value, a local maximum value, and a local minimum value. For example, when the extremal value is a maximum value, the second interference signal is set to be reduced in amplitude, i.e., attenuated as the scale moves away from the origin.

The position at which the phase difference between the first and second interference signals is the predetermined value, and at which the second interference signal has the extremal value can easily be calculated at higher speed by the computing unit using an analog signal output from the light receiving portion. Because the origin is determined based on the phase difference of interference signals, the origin can be detected more accurately. Although the origin can be detected only by detecting a position at which the second interference signal has the extremal value, detection accuracy thereof is low, as compared with the detection accuracy based on the phase difference between interference signals. Thus, according to the present invention, the position at which the phase difference between interference signals is the predetermined value, and at which the second interference signal has the extremal value is obtained.

Hereinafter, exemplary embodiments for practicing the present invention is described more specifically with reference to the accompanying drawings. However, the present invention is not limited to the following exemplary embodiments.

Figure 2:
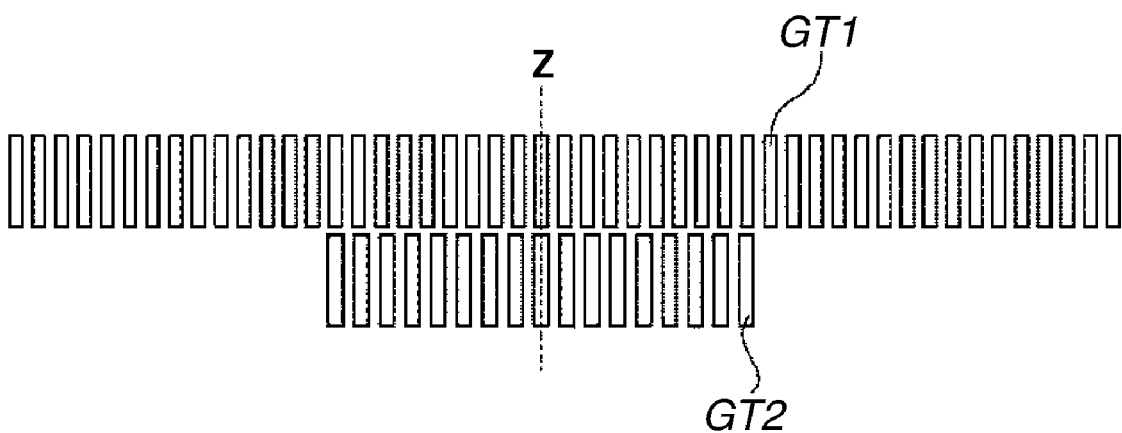
FIG. 2 is a schematic diagram illustrating first and second diffraction grating portions formed on a scale according to the first exemplary embodiment of the present invention.

FIG. 1 is a schematic diagram illustrating a configuration of an origin detection apparatus according to a first exemplary embodiment of the present invention. FIG. 2 is a schematic diagram illustrating first and second diffraction grating portions formed on a scale according to the first exemplary embodiment. As illustrated in FIGS. 1 and 2, the origin detection apparatus according to the first exemplary embodiment includes a light source LD, a collimator lens LNS, an aperture member AP, a slit member SL, mirrors ML and MR, quarter wavelength plates WPL and WPR, a scale SC, and mirrors M1 and M2.

First, components of the origin detection apparatus according to the present exemplary embodiment, and the configuration of the components thereof are described hereinafter.

The scale SC is movable relatively and linearly with respect to the light source LD in a direction of arrow A illustrated in FIG. 1. A first diffraction grating portion GT1 and a second diffraction grating portion GT2 are formed integrally on the scale SC. The first diffraction grating portion GT1 has a grating pitch P1 (e.g., 2.8 μm). The second diffraction grating portion GT2 has a grating pitch P2 (e.g., 2.94 μm) and differs from the grating pitch P1. The first grating portion GT1 and the second grating portion GT2 are formed such that a central grating line (slit pattern) of the first grating portion GT1 is adjusted to a central grating line (slit pattern) of the second grating portion GT2 (see a Z-line illustrated in FIG. 2). This position is determined as an origin point of displacement of the scale SC. According to the present exemplary embodiment, the first diffraction grating portion GT1 is provided to measure relative displacement of the scale from the origin and to widely extend over a measurable region. On the other hand, the second diffraction grating portion GT2 is provided to detect the origin and locally formed at positions including the origin to be narrower than the first diffraction grating. According to the present exemplary embodiment, a width of the second diffraction grating portion GT2 in a displacement direction is set at about 100 μm (corresponding to a width of 34 gratings), so that a width of a light flux irradiated onto the second diffraction grating portion GT2 is set at about 100 μm.

A laser diode is used as the light source LD. The light source LD emits a divergent light flux. The collimator lens LNS is located below the light source LD. The aperture member AP in which apertures AP1 and AP2 are formed is located below the collimator lens LNS. The aperture member AP is provided on a plane which is parallel to the scale SC.

The slit member SL on which the first transmission type diffraction slit GBS1 and the second transmission type diffraction slit GBS2 are formed integrally is provided below the aperture member AP. The first diffraction slit GBS1 has the grating pitch P1 (e.g., 2.8 μm). The second diffraction slit GBS2 has the grating pitch P2 (e.g., 2.94 μm). The first diffraction slit GBS1 and the second diffraction slit GBS2 are formed such that a central grating line of the first diffraction slit GBS1 is adjusted to a central grating line of the second diffraction slit GBS2.

The mirrors ML, MR, M1, and M2 are provided between the slit member SL and the scale SC. The mirrors ML and MR are provided to be perpendicular to surfaces of the aperture member AP and the scale SC so that a direction of a normal line of each of the mirrors ML and MR is the same as that of an arrow A. Further, the mirrors ML and MR are arranged that reflection surfaces thereof face each other. The mirrors M1 and M2 are arranged so that reflection surfaces thereof are provided at the side of the scale, and that the direction of a normal line of each of the mirrors M1 and M2 intersects with the direction of a normal line of each of the aperture member AP and the scale SC.

Figure 3:
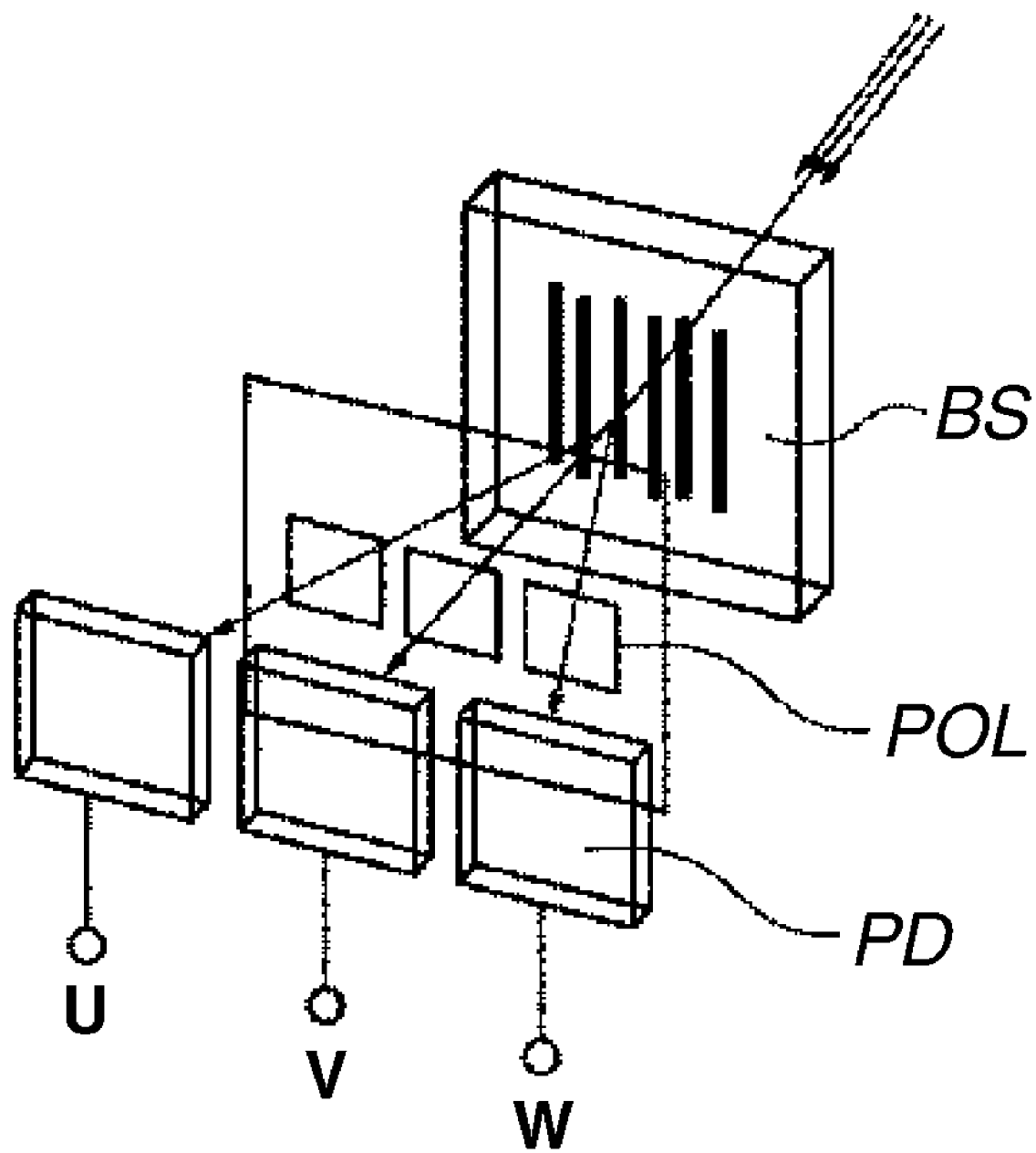
FIG. 3 is a schematic diagram illustrating a configuration of a light receiving unit constituting a light receiving portion according to the first exemplary embodiment of the present invention.

The light receiving portion is located at a position at which the light receiving portion receives light fluxes reflected by the mirrors M1 and M2. FIG. 3 is a schematic diagram illustrating a configuration of a light receiving unit for receiving a light flux reflected by the mirror M1. A light receiving unit for receiving a light flux reflected by the mirror M2 has a similar configuration. The light receiving portion includes a plurality of the light receiving units. Each of the light receiving units includes a wave front splitting element BS for splitting an incident light flux into three light fluxes, a polarizing plate array POL having three polarizing plates which respectively transmit a plurality of split light fluxes, and light receiving element arrays PD which respectively receive the light fluxes transmitted through the polarizing plate array POL. The three polarizing plates constituting the polarizing plate array POL are arranged so that direction angles of polarization transmission axes of the adjacent polarizing plates are shifted by 120 degrees.

Next, the optical path of a light flux emitted from the light source LD in the origin detection apparatus according to the present exemplary embodiment is described hereinafter.

A divergent light flux emitted from the light source LD is converted by the collimator lens LNS into a parallel light flux as a linearly polarized light flux. Then, the parallel light flux is split by two apertures AP1 and AP2 into two parallel light fluxes. These light fluxes are transmitted through the first diffraction slit GBS1 and the second diffraction slit GBS2, respectively, and diffracted to become diffraction light fluxes of a plurality of orders of diffraction including first positive/negative order diffraction light fluxes. The first positive/negative order diffraction light fluxes transmitted through the first diffraction slit GBS1 and the second diffraction slit GBS2 are reflected by the mirrors ML and MR, respectively. The reflected light fluxes are transmitted through the quarter wavelength plates WPL and WPR which are arranged so that a polarization axes thereof are shifted from each other. Then, the light fluxes from the quarter wavelength plates WPL and WPR are irradiated onto the first diffraction grating portion GT1 and the second diffraction grating portion GT2 as circularly polarized light fluxes whose polarization directions are rotated in opposite directions.

The first positive order reflection diffraction light flux of the light flux irradiated onto the first diffraction grating portion GT1 via the mirror MR and the first negative order reflection diffraction light flux of the light flux irradiated onto the first diffraction grating portion GT1 via the mirror ML overlap parallel to each other. Both of the diffraction light fluxes are emitted by converting the circularly polarized light fluxes, whose polarization directions are rotated in opposite directions, into linearly polarized light fluxes whose directions are changed according to the phase difference therebetween. Then, the emitted light fluxes are introduced to the light receiving unit via the mirror M1. The linearly polarized light flux introduced into the light receiving unit is split into three light fluxes by the wave front splitting element BS. The three light fluxes are respectively transmitted through the three polarizing plates of the three-phase polarizing plate array POL which are arranged so that the direction angles of the polarization transmission axes of the adjacent polarizing plates are shifted by 120 degrees. Thus a first interference light which includes a plurality of interference light fluxes whose phases are shifted by 120 degrees from each other is obtained. The interference light fluxes respectively having a plurality of phases, which are the first interference light, are incident upon three light receiving elements of the light receiving element array PD. Then, the three light receiving elements respectively output three sine-wave-like first periodic signals U1, V1, and W1, whose phases are shifted by 120 degrees each other and whose periodic pitches are equal to a quarter of the grating pitch of the diffraction grating portion GT1.

Figure 4A:
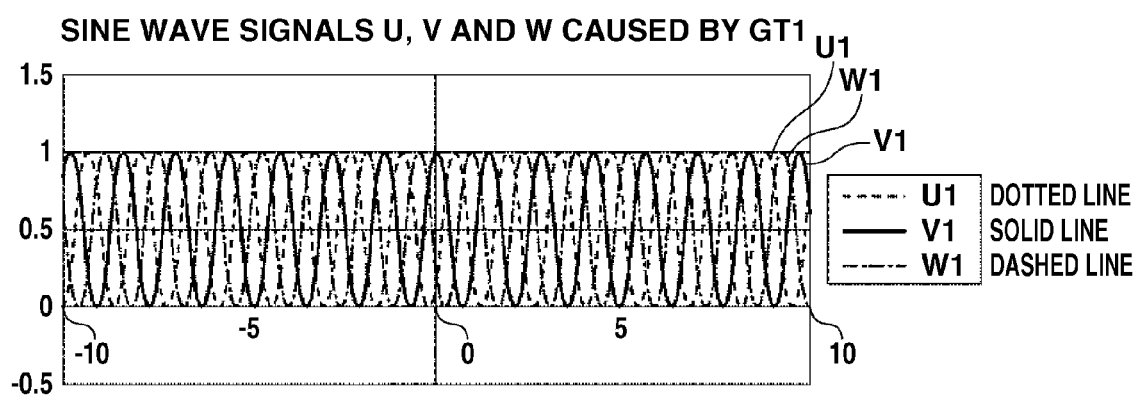
FIGS. 4A and 4B are waveform charts illustrating waveforms of periodic signals generated by a first diffraction grating portion.
Figure 4B:
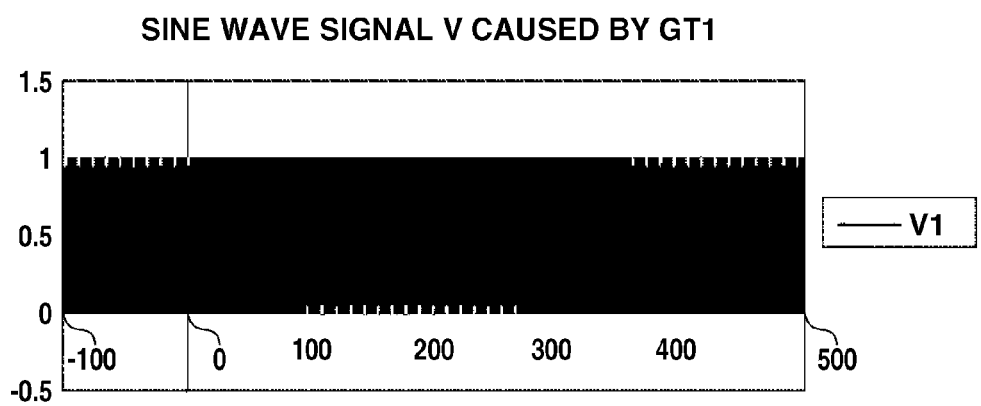

FIGS. 4A and 4B are waveform charts illustrating waveforms of the periodic signals U1, V1, and W1 generated by the first diffraction grating portion GT1, whose grating pitch P1 is 2.8 μm. FIG. 4A illustrates the waveforms of the periodic signals U1, V1, and W1 within a region of distances from the origin, which range between ±10 μm. FIG. 4B illustrates the waveform of the periodic signal V1 within a region of distances from the origin, which range from −100 μm to +500 μm. In FIG. 4B, the waveform of the periodic signal V1 is represented as an area filled with black, because the waveform of the periodic signal V1 is densely distributed. In FIGS. 4A and 4B, an abscissa axis represents the displacement of the scale from the origin at which the displacement is 0. An ordinate axis represents a normalized value of each of the periodic signals. In the following description, in each of the drawings illustrating waveforms of the signals, the abscissa axis and the ordinate axis represent the displacement of the scale from the origin and the normalized value of each of the periodic signals, similarly to FIGS. 4A and 4B. Each of figures with a figure number to which a suffix A is attached illustrates the waveform in the region in which the distance from the origin ranges ±10 μm. Each of figures with a figure number to which a suffix B is attached illustrates the waveform within the region in which the distance from the origin ranges from −100 μm to +500 μm.

Similarly, the first positive order reflection diffraction light flux generated from the light flux irradiated onto the second diffraction grating portion GT2 via the mirror MR and the first negative order reflection diffraction light flux generated from the light flux irradiated onto the second diffraction grating portion GT2 via the mirror ML are slightly shifted and substantially overlap parallel to each other. Both of the diffraction light fluxes are emitted by converting the circularly polarized light fluxes, whose polarization directions are rotated in opposite directions, into linearly polarized light fluxes whose directions are changed according to the phase difference therebetween. Then, the emitted light fluxes are introduced to another light receiving unit via the mirror M2. The light receiving unit receives the diffraction light fluxes, similarly to the light receiving unit that receives the diffraction light fluxes caused by the first diffraction grating portion GT1. Then, the light receiving elements of the light receiving unit respectively output three sine-wave-like second periodic signals U2, V2, and W2, whose phases are shifted by 120 degrees from each other and whose periodic pitches are equal to a quarter of the grating-pitch of the diffraction grating portion GT2. It is assumed that the periodic signals U2, V2, and W2 are in-phase with those U1, V1, and W1, respectively.

Figure 5A:
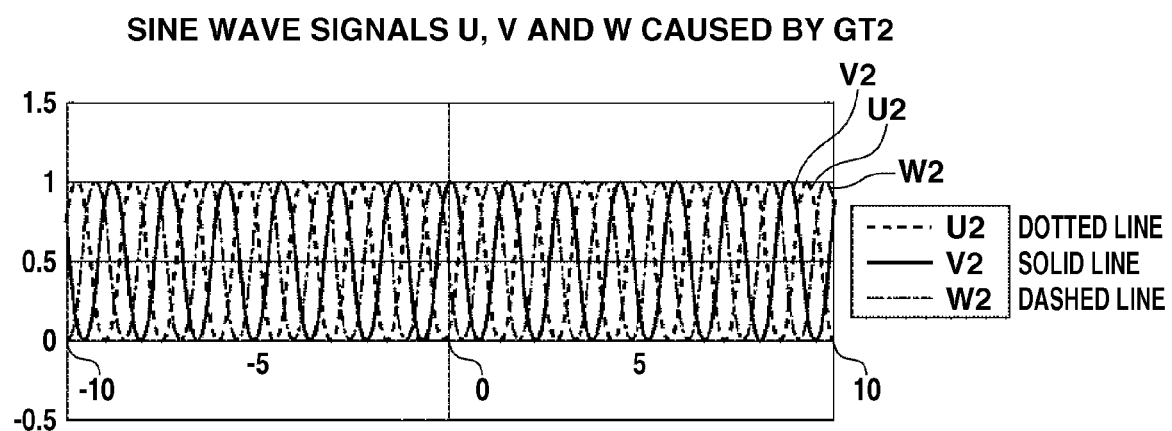
FIGS. 5A and 5B are waveform charts illustrating waveforms of periodic signals generated by a second diffraction grating.
Figure 5B:
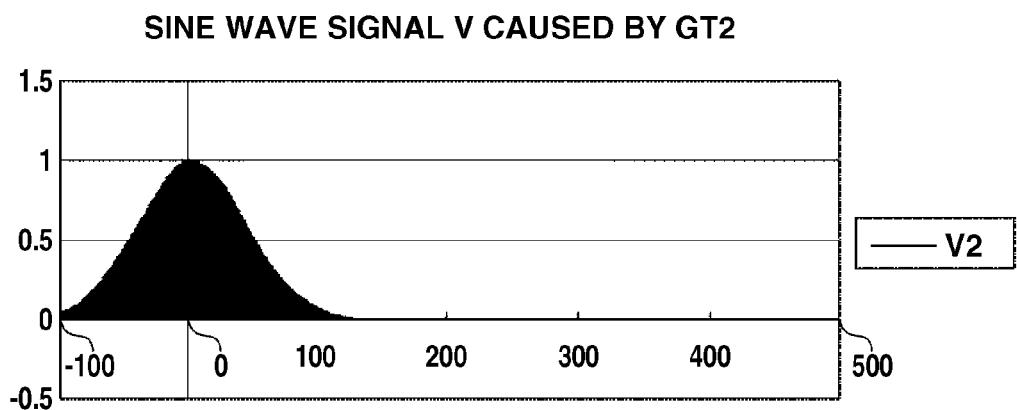

FIGS. 5A and 5B are waveform charts illustrating waveforms of the periodic signals U2, V2, and W2 generated by the second diffraction grating portion GT2, whose grating pitch P2 is 2.94 μm. In FIG. 5B, the waveform of the periodic signal V2 is represented as an area filled with black, because the waveform of the periodic signal V2 is densely distributed. As illustrated in from FIG. 5B, the amplitude of the periodic signal generated by the second diffraction grating portion GT2 decreases as an absolute value of the distance from the origin increases. According to the present exemplary embodiment, it is assumed that the width of the second diffraction grating portion GT2 in the displacement direction and the width of light fluxes to be irradiated thereon in the displacement direction are about 100 μm. The reduction in the amplitude of the periodic signal is caused according to the principle that intensity of diffracted light is reduced due to a deviation of the overlap between the second diffraction grating portion GT2 and the light flux irradiated thereon. More specifically, this phenomenon is caused by the fact that the second diffraction grating portion GT2 is narrower than the first diffraction grating portion GT1 and formed locally at a place including the origin.

Next, signal processing in the origin detection apparatus according to the present exemplary embodiment is described hereinafter.

Figure 6:
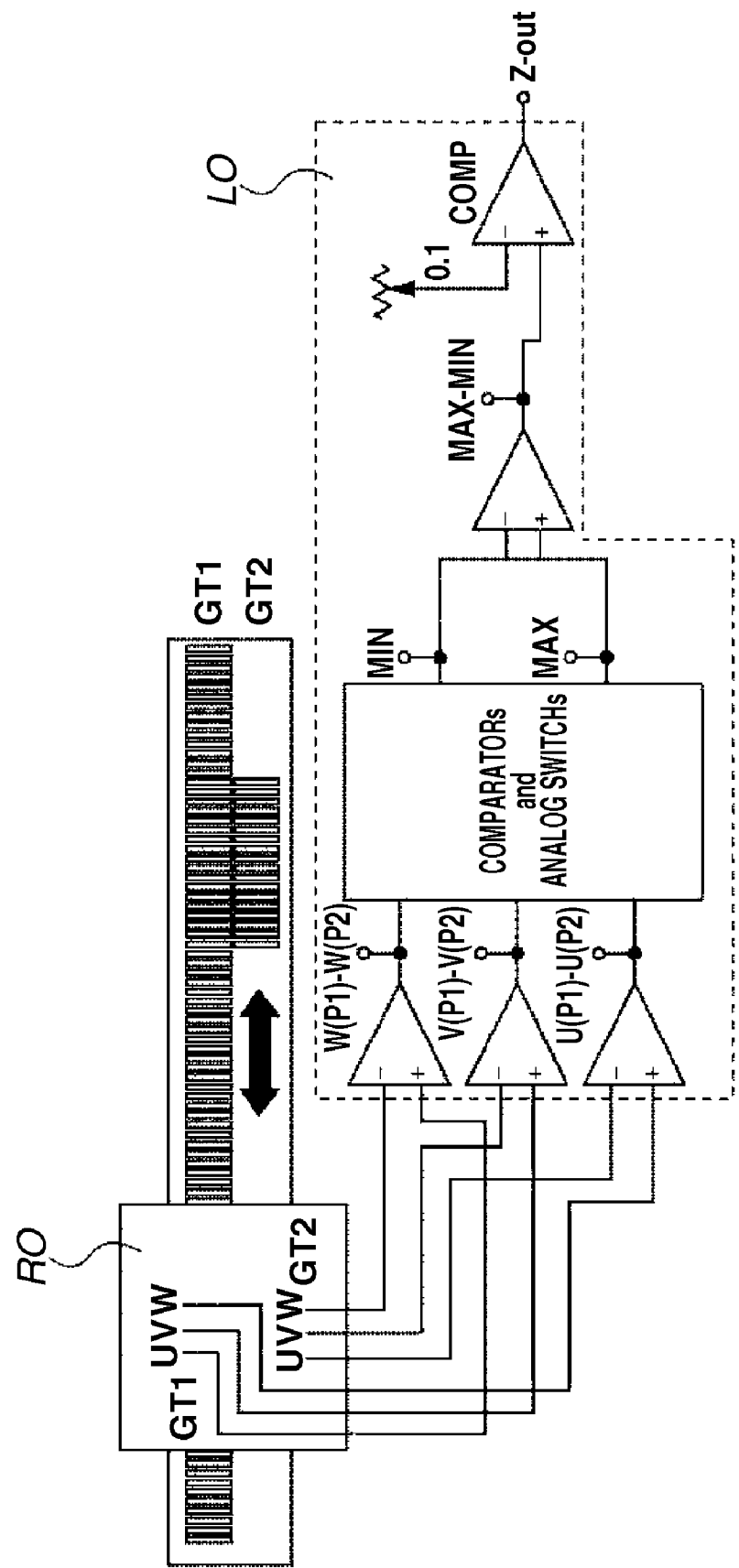
FIG. 6 is a circuit diagram illustrating a computing unit of the origin detection apparatus according to the first exemplary embodiment of the present invention.

FIG. 6 is a circuit diagram illustrating the computing unit LO that outputs origin signals based on the periodic signals output from a light receiving portion RO.

The first periodic signals U1, V1, and W1 and the second periodic signals U2, V2, and W2 output from the light receiving portion RO are input to the computing unit LO.

Figure 7A:
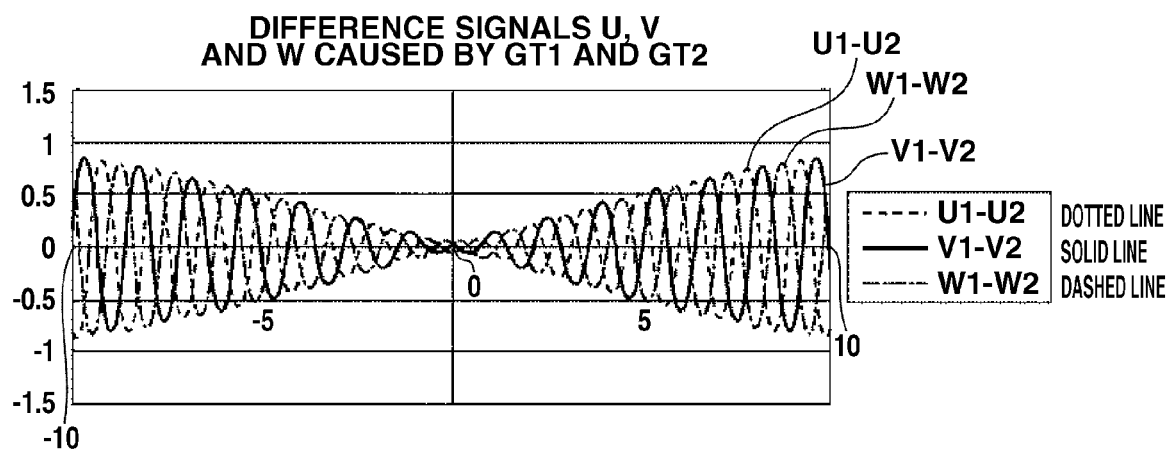
FIGS. 7A and 7B are waveform charts illustrating waveforms of signals representing differences between the first and second periodic signals.
Figure 7B:
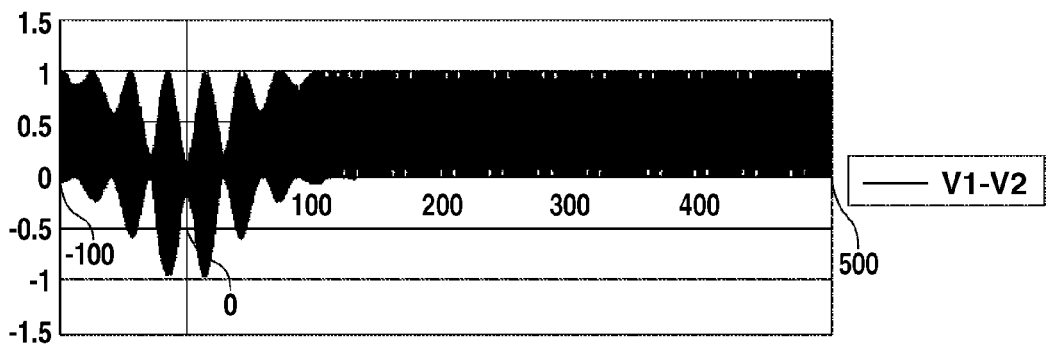

As illustrated in FIGS. 7A and 7B, the computing unit LO calculates the difference between the first and second periodic signals having each of phases U, V, and W. As illustrated in FIG. 7A, the amplitudes of signals representing the calculated difference have a local minimum value at the origin. Thus, it can be understood that the phase difference between the first and second periodic signals including each of phases U, V, and W becomes zero, that is, the phase of the first periodic signal is matched with that of the second periodic signal. FIG. 7B shows that, in addition to the origin, there are a plurality of positions at which the amplitude of the signal representing the difference between the first and second periodic signals has a local minimum value, and that the positions, at which the amplitude has a local minimum value, correspond to positions at which the phase difference between the first and second periodic signals is zero. The positions at which the amplitude has a local minimum value are present at intervals of 28 μm.

Figure 8A:
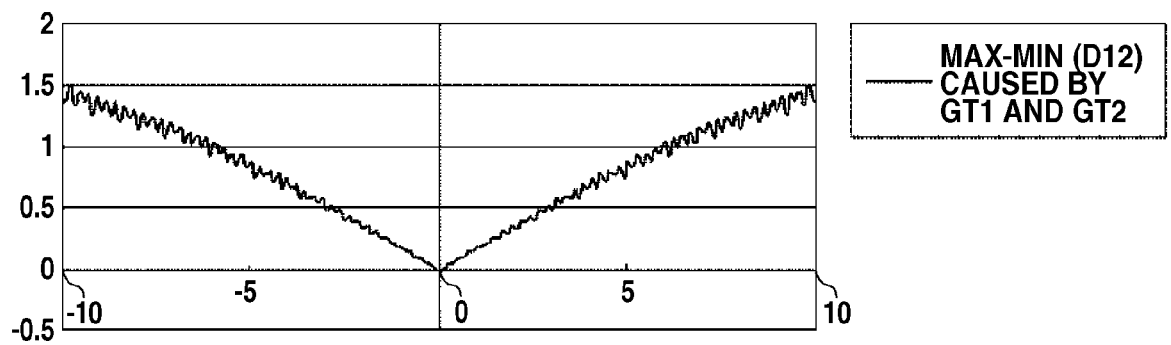
FIGS. 8A and 8B are waveform charts illustrating waveforms of signals representing differences between a value of a phase in which the difference between the first and second periodic signals is maximized, and that of a phase in which the difference therebetween is minimized.
Figure 8B:
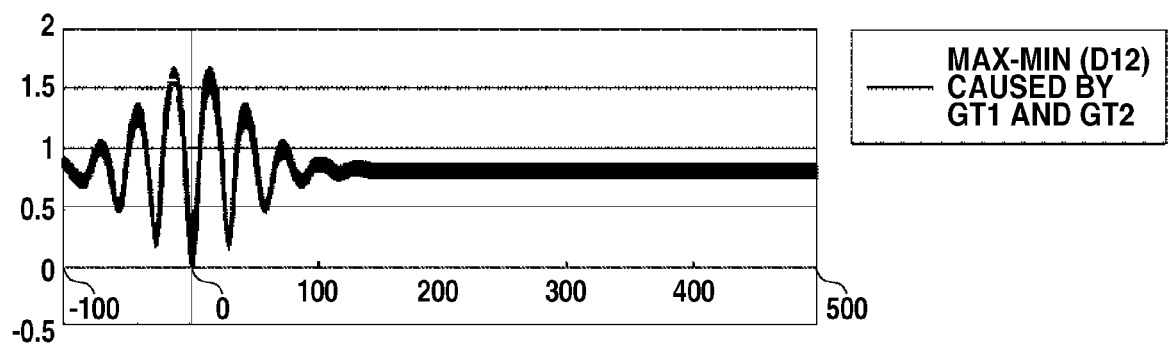

Next, as illustrated in FIGS. 8A and 8B, the computing unit LO obtains a difference D12 between a value of the difference between the first and second periodic signals of a phase, in which the difference therebetween is maximized, and a value of the difference therebetween of another phase, in which the difference therebetween is minimized. As illustrated in FIG. 8A, the difference D12 between a maximum value and a minimum value is zero at the origin. As illustrated in FIG. 8B, although there are a plurality of positions at which the difference D12 between the maximum value and the minimum value is locally minimized, in addition to the origin, the value of the difference D12 at each position other than the origin is not zero. For example, a local minimum value at a position located at a distance of 28 μm from the origin is about 0.2.

Figure 9A:
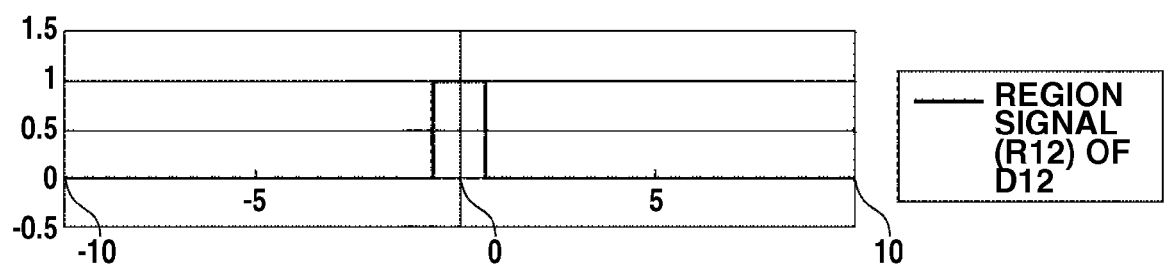
FIGS. 9A and 9B are waveform charts illustrating waveforms of rectangular signals obtained from the differences between the first and second periodic signals.
Figure 9B:
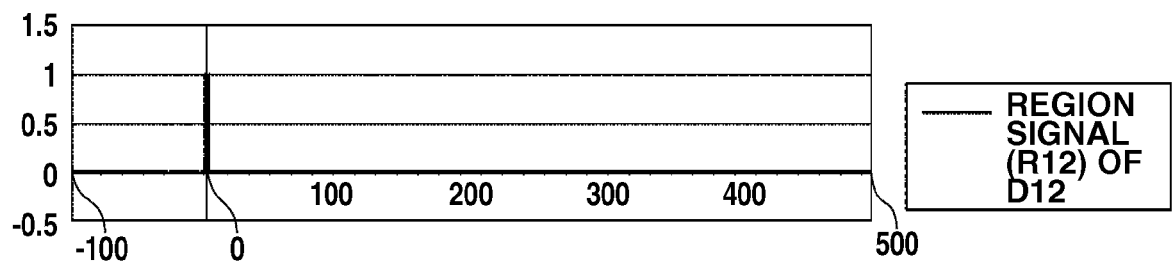

Next, as illustrated in FIGS. 9A and 9B, the computing unit LO binarizes a signal representing the difference D12 between the maximum value and the minimum value of the difference between the first and second periodic signals, according to whether the difference D12 is equal to or less than a predetermined value. Thus, the computing unit LO outputs a rectangular signal R12. For example, the predetermined value is set at 0.1. When the difference D12 between the maximum value and the minimum value is equal to or less than 0.1, the value of the signal R12 is set at 1. Otherwise, the value of the signal R12 is set at zero. Thus, the positions at which the difference D12 between the maximum value and the minimum value is locally minimized, other than the origin can be eliminated by comparing the difference between the maximum value and the minimum value with the predetermined value. Accordingly, the rectangular signal can be output as an origin signal indicating the position of the origin. The above described processing of the computing unit can be performed by calculation of a difference and a sum and calculation of the maximum value and the minimum value using a comparator or the like. Consequently, the computing unit can execute the above computing process with a simple circuit configuration. In addition, the computing unit can execute the computing process quickly.

The computing unit can output a more accurate origin signal by obtaining a logical product of the rectangular signal and a signal representing the positions at which the phase of the periodic signal (corresponding to, e.g., the phase V) generated by the first diffraction grating portion GT1 has a predetermined value (e.g., zero).

An origin detection apparatus according to a second exemplary embodiment of the present invention adds countermeasures against a case where it is difficult to identify an origin from a plurality of positions at which the phase difference is zero, in view of circumstances of designing the grating pitch P1 of the first diffraction grating portion, the grating pitch P2 of the second diffraction grating portion, and a size of an illumination light flux.

Figure 10:
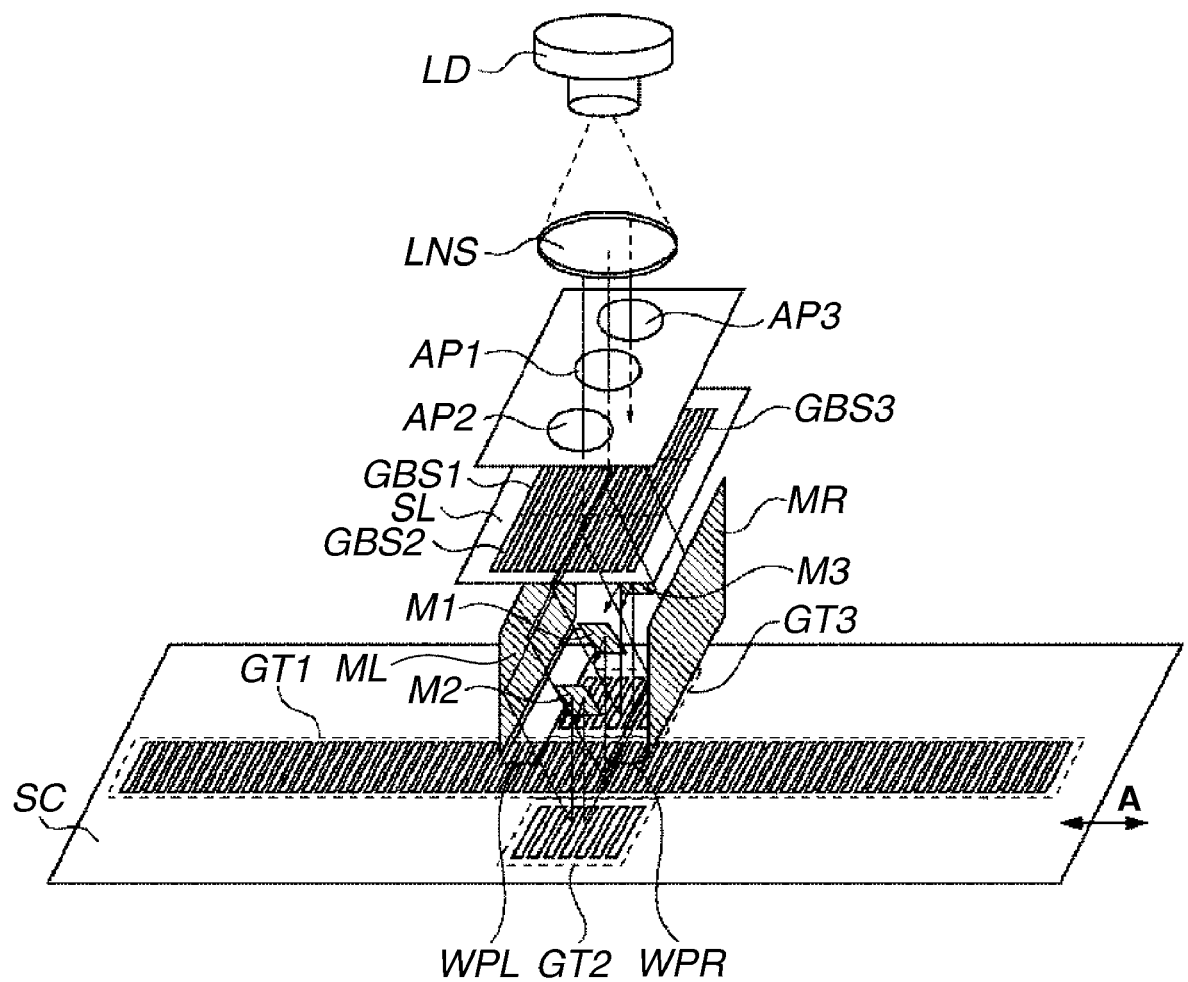
FIG. 10 is a schematic diagram illustrating a configuration of an origin detection apparatus according to a second exemplary embodiment of the present invention.

FIG. 10 is a schematic diagram illustrating a configuration of the origin detection apparatus according to the second exemplary embodiment of the present invention. In FIG. 10, each component similar to an associated component of the apparatus illustrated in FIG. 1 is designated with the same reference numeral used in FIG. 1. The origin detection apparatus according to the second exemplary embodiment includes a mirror M3, a third diffraction grating portion T3, a third diffraction slit GBS3, and an aperture AP3.

First, components and a configuration thereof in the origin detection apparatus according to the present exemplary embodiment, which differ from those of the origin detection apparatus according to the first exemplary embodiment, are described hereinafter.

The third diffraction grating portion GT3 is formed together with the first diffraction grating portion GT1 and the second diffraction grating portion GT2 integrally with the scale SC. The third diffraction grating portion GT3 is formed at a position at which the third diffraction grating portion GT3 faces the second diffraction grating portion GT2 across the first diffraction grating portion GT1. The third diffraction grating portion GT3 has a grating pitch P3 (e.g., 2.856 µm) which differs from the grating pitch P1 (e.g., 2.8 µm) and the grating pitch P2 (e.g., 2.94 µm). A central grating line (slit pattern) of the third diffraction grating portion GT3 is formed to be located at a position corresponding to the positions of the central grating lines of the first diffraction grating portion GT1 and the second diffraction grating portion GT2. This position is determined as the position of the origin of displacement of the scale SC.

In the present exemplary embodiment, the first diffraction grating portion GT1 is provided to measure the relative displacement of the scale from the origin and to widely extend over the measurable region. On the other hand, the second diffraction grating portion GT2 and the third diffraction grating portion GT3 are provided to detect the origin, and formed at a place including the origin so as to be narrower than the first diffraction grating portion GT1. According to the present exemplary embodiment, the width each of the second diffraction grating portion GT2 and the third diffraction grating portion GT3 is set at about 500 µm in the displacement direction of the scale. The width of a light flux to be irradiated on the second diffraction grating portion GT2 and the third diffraction grating portion GT3 is set at about 500 µm in the displacement direction.

In the aperture member AP, the aperture AP3 is formed at a position at which the aperture AP3 faces the aperture AP2 across the aperture AP1.

The third diffraction slit GBS3 is formed integrally with the slit member SL at a position at which the third diffraction slit GBS3 faces the second diffraction slit GBS2 across the first diffraction slit GBS1. The third diffraction slit GBS3 is formed with a grating pitch P3 (e.g., 2.856 µm), and that the central grating line of each of the first diffraction slit GBS1 and the second diffraction slit GBS2 is adjusted to the central grating line of the third diffraction slit GBS3.

The mirror M3 is provided, similarly to the mirrors M1 and M2, so that the reflection surface thereof is located at the side of the scale, and that the direction of a normal line thereof intersects with the direction of normal lines of the aperture member AP and the scale SC. The light receiving portion is located at a position at which the light receiving portion can receive light fluxes reflected by the mirrors M1, M2, and M3.

Next, an optical path of a light flux emitted from the light source in the origin detection apparatus according to the present exemplary embodiment is described hereinafter.

Divergent light fluxes emitted from the light source LD are converted by the collimator lens LNS into parallel light fluxes as linearly polarized light fluxes. Then, the parallel light fluxes are separated into three parallel light fluxes by the three apertures AP1, AP2, and AP3. The three parallel light fluxes are transmitted through the first diffraction slit GBS1, the second diffraction slit GBS2, and the third diffraction slit GBS3 to become diffraction light fluxes of a plurality of orders of diffraction including first positive/negative order diffraction light fluxes. The first positive/negative order diffraction light fluxes transmitted through the first diffraction slit GBS1, the second diffraction slit GBS2, and the third diffraction slit GBS3 are reflected by the mirrors ML and MR, respectively. Then, the reflected light fluxes transmit through the quarter wavelength plates WPL and WPR and are irradiated onto the first diffraction grating portion GT1, the second diffraction grating portion GT2, and the third diffraction grating portion GT3 as circularly polarized light fluxes whose polarization directions are rotated in opposite directions.

First interference light fluxes caused by the light fluxes irradiated onto the first diffraction grating portion GT1 are changed by the light receiving portion into three sine-wave-like first periodic signals U1, V1, and W1, whose phases are shifted by 120 degrees from each other and whose periodic pitches are equal to a quarter of the grating pitch of the diffraction grating portion GT1. Then, the first periodic signals U1, V1, and W1 are output therefrom. The first periodic signals have the waveforms illustrated in FIGS. 4A and 4B, similarly to those according to the first exemplary embodiment of the present invention.

Figure 11A:
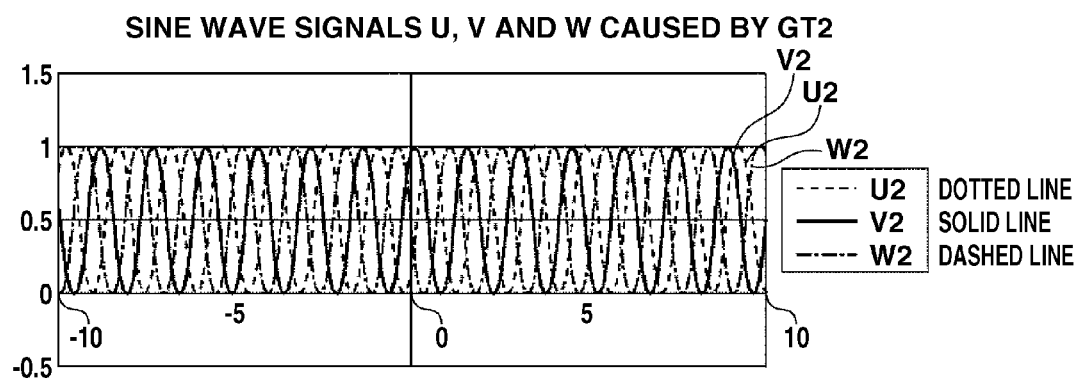
FIGS. 11A and 11B are waveform charts illustrating waveforms of periodic signals generated by a second diffraction grating portion.
Figure 11B:
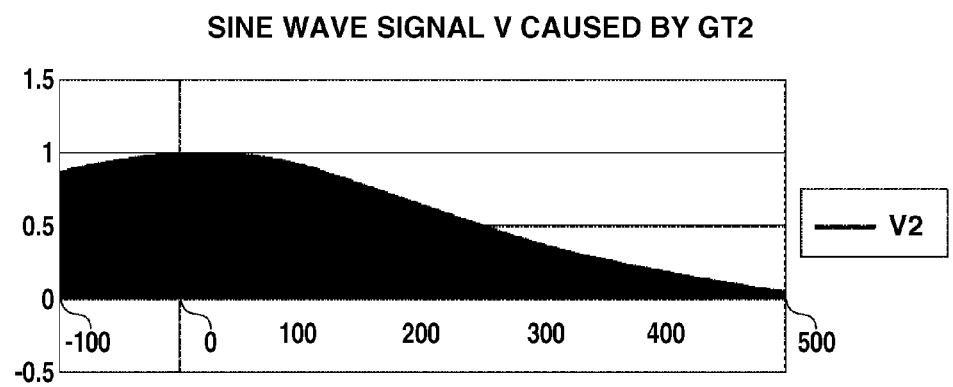

On the other hand, second interference light fluxes generated from light fluxes irradiated onto the second diffraction grating portion GT2 are changed by the light receiving portion to second periodic signals U2, V2 and W2 illustrated in FIGS. 11A and 11B. Then, the second periodic signals U2, V2, and W2 are output therefrom. As illustrated in FIG. 11B, the attenuation of the amplitude is small even when a distance from the origin is large, as compared with the first exemplary embodiment. This is because that the width of each of the second diffraction grating portion GT2 and the third diffraction grating portion GT3 in the displacement direction and the width of light fluxes to be irradiated thereon in the displacement direction are about 500 µm, and a rate of a deviation of the overlap between the second diffraction grating portion GT2 and the light flux irradiated thereon corresponding to a predetermined displacement is low.

Figure 12A:
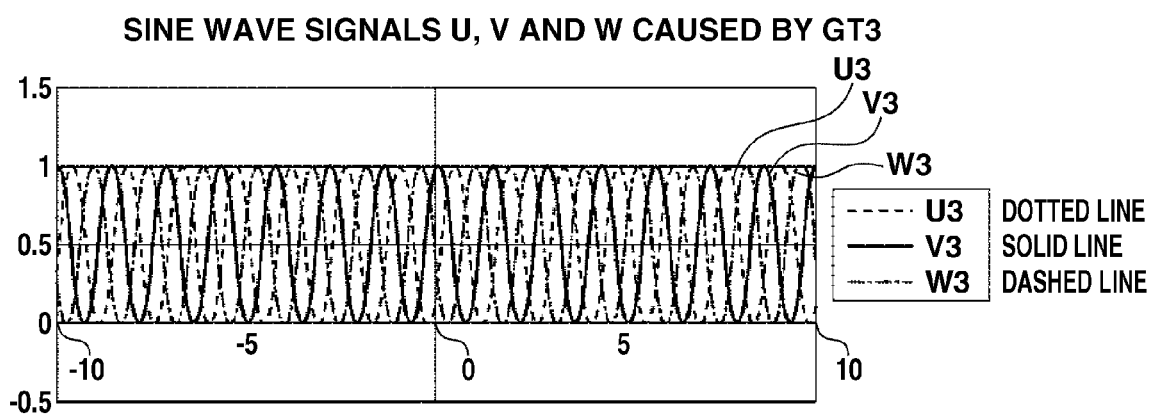
FIGS. 12A and 12B are waveform charts illustrating waveforms of periodic signals generated by a third diffraction grating portion.
Figure 12B:
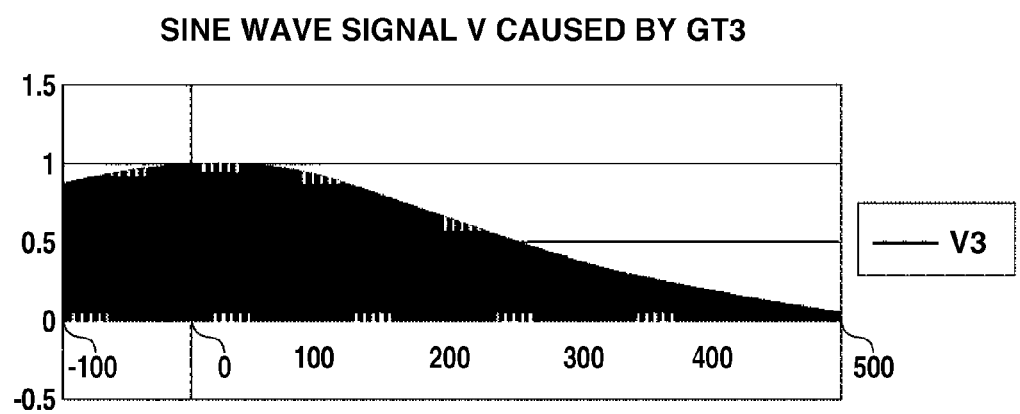

Third interference light fluxes generated from light fluxes irradiated onto the third diffraction grating portion GT3 are incident upon the light receiving portion through an optical path similar to the optical paths of the light fluxes irradiated on the first diffraction grating portion GT1 and the second diffraction grating portion GT2 and changed to third periodic signals U3, V3, and W3 illustrated in FIGS. 12A and 12B, which are output therefrom. As illustrated in FIG. 12B, the third periodic signals U3, V3, and W3 are attenuated at a comparable level to that of the second periodic signals U2, V2, and W2. The first through third periodic signals respectively corresponding to the phases U1, U2, and U3 are in-phase with one another. This is the same with the first through third periodic signals corresponding to each of the phases V and W.

Next, signal processing in the origin detection apparatus according to the present exemplary embodiment is described hereinafter.

FIG. 13 is a circuit diagram illustrating the computing unit LO which outputs an origin signal based on periodic signals output from the light receiving portion RO.

The first periodic signals U1, V1, and W1, the second periodic signals U2, V2, and W2, and the third periodic signals U3, V3, and W3 output from the light receiving portion RO are input to the computing unit LO.

Figure 14A:
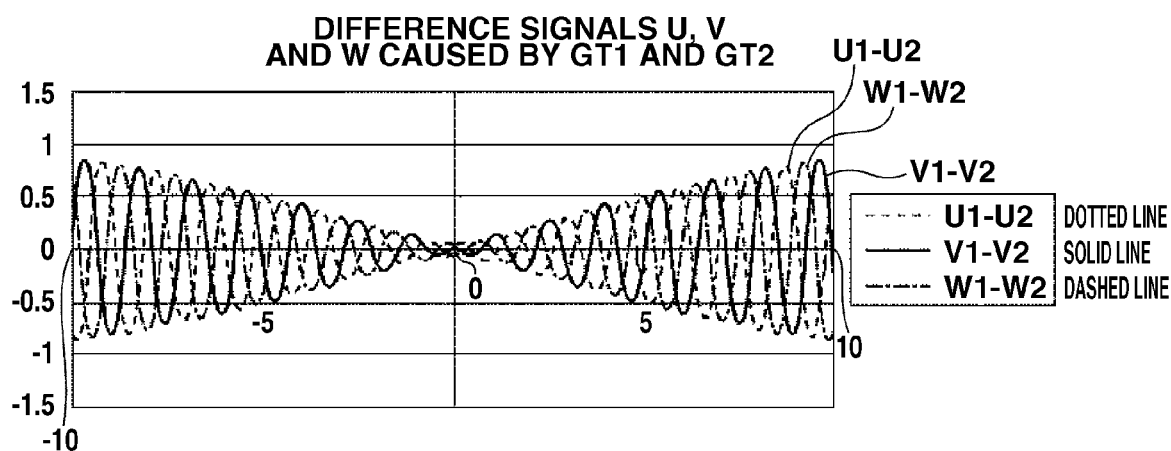
FIGS. 14A and 14B are waveform charts illustrating waveforms of signals representing differences between the first and second periodic signals.
Figure 14B:
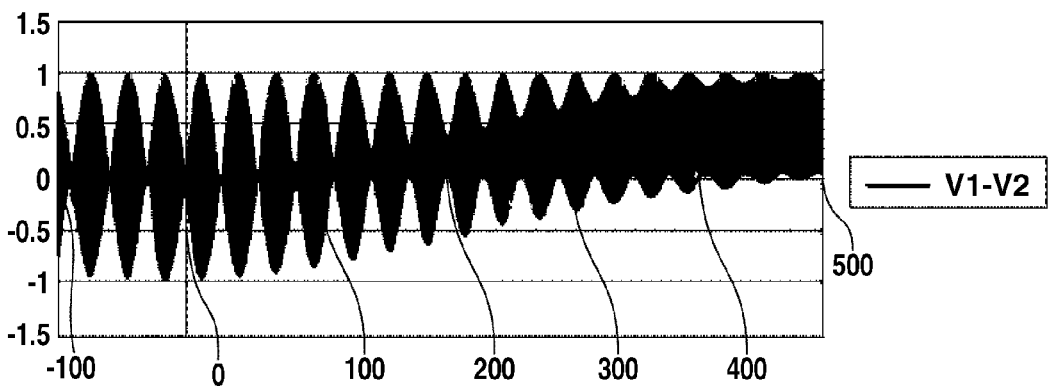
Figure 15A:
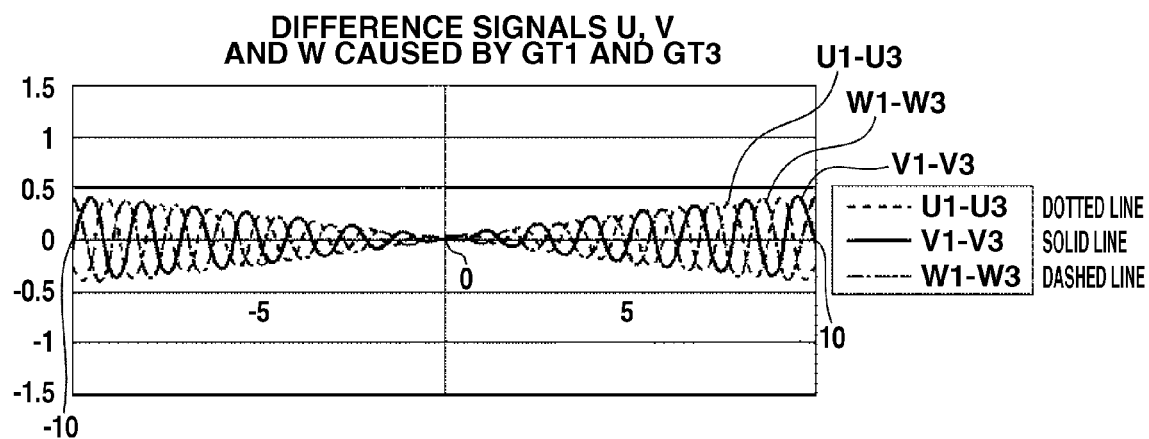
FIGS. 15A and 15B are waveform charts illustrating waveforms of signals representing differences between the first and third periodic signals.
Figure 15B:
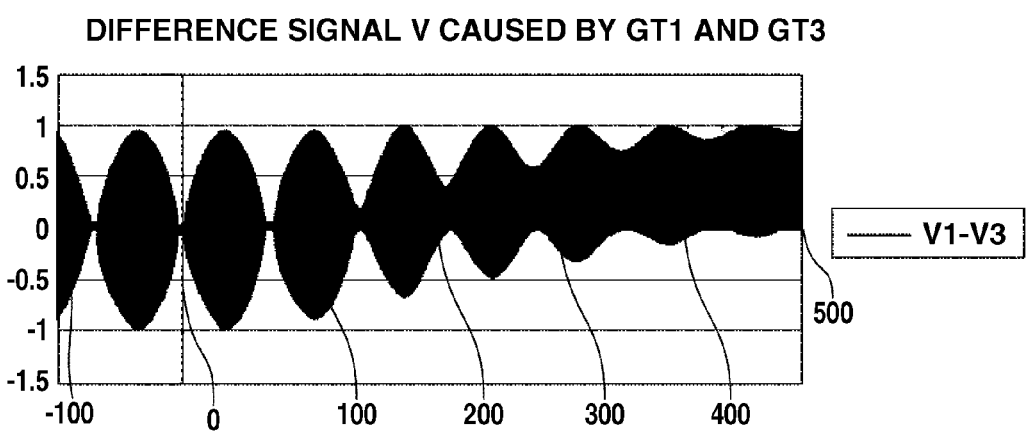

As illustrated in FIGS. 14A and 14B, the computing unit LO calculates the difference between the first and second periodic signals having each of phases U, V, and W. As illustrated in FIGS. 15A and 15B, the computing unit LO calculates the difference between the first and third periodic signals having each of phases U, V, and W. As illustrated in FIG. 14A, the amplitude of a signal representing the calculated difference therebetween has a local minimum value at the origin. Thus, it is understood that the phase difference between the first and second periodic signals having each of phases U, V, and W is matched with that of the second periodic signal having the same phase U, V, and W. As illustrated in FIG. 15A, the phase of the first periodic signal having each of phases U, V, and W is matched with that of the third periodic signal having the same phase U, V, and W. FIGS. 14B and 15B show that there are a plurality of positions at which the amplitudes have local minimum values, respectively, in addition to the origin and that the positions at which the amplitude has a local minimum value correspond to positions at which the phase difference between the first and second periodic signals or between the first and third periodic signals is zero, respectively. As illustrated in FIG. 14B, the positions at which the amplitude has the local minimum value are present at intervals of 28 µm. As illustrated in FIG. 15B, the positions at which the amplitude has the local minimum value are present at intervals of 70 µm.

Next, as illustrated in FIGS. 16A and 16B, the computing unit LO obtains a difference D12 between a value of the difference between the first and second periodic signals of a phase, in which the difference therebetween is maximized, and a value of the difference therebetween of another phase, in which the difference therebetween is minimized. Further, the computing unit LO obtains a difference D13 between a value of the difference between the first and third periodic signals of a phase, in which the difference therebetween is maximized, and a value of the difference therebetween of another phase, in which the difference therebetween is minimized. As illustrated in FIG. 16A, both of the difference D12 between a maximum value and a minimum value and the difference D13 between a maximum value and a minimum value are zero at the origin. As illustrated in FIG. 16B, there are a plurality of positions at which the difference between the maximum value and the minimum value is locally minimized, in addition to the origin, in both cases where the difference is D12 and where the difference is D13. However, the value of the difference at each position other than the origin is not zero.

Figure 17A:
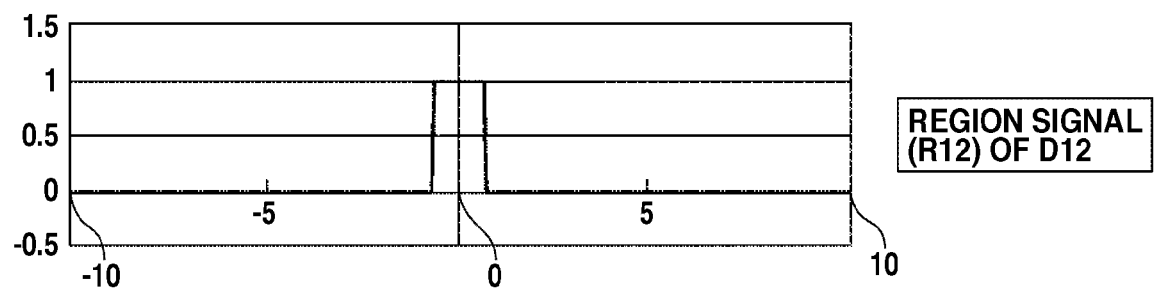
FIGS. 17A and 17B are waveform charts illustrating waveforms of rectangular signals obtained from the differences between the first and second periodic signals.
Figure 17B:
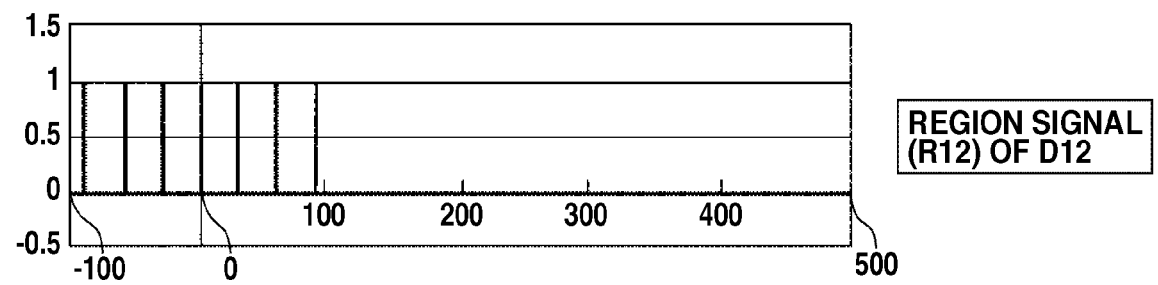
Figure 18A:
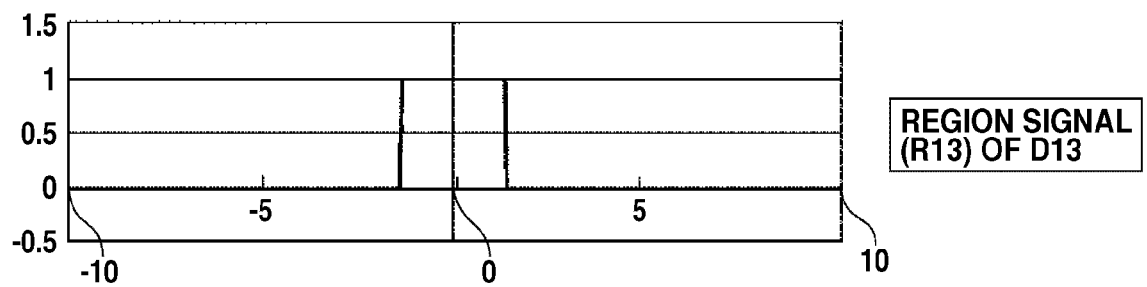
FIGS. 18A and 18B are waveform charts illustrating waveforms of rectangular signals obtained from the differences between the first and third periodic signals.
Figure 18B:
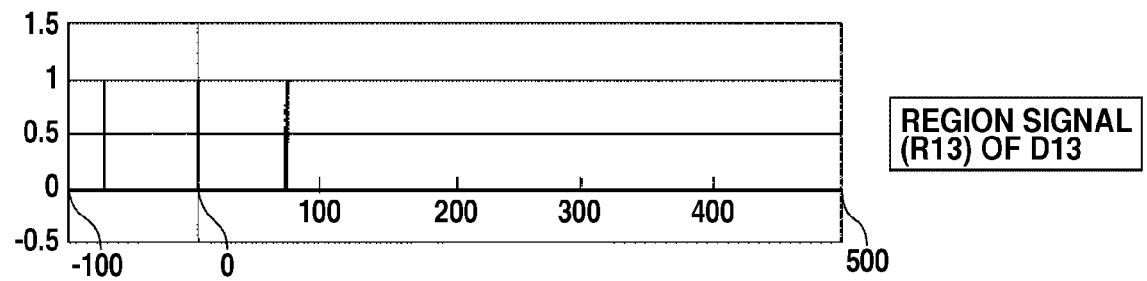

Next, as illustrated in FIGS. 17A and 17B, the computing unit LO binarizes a signal representing the difference D12 between the maximum value and the minimum value of the difference between the first and second periodic signals, according to whether the difference D12 is equal to or less than a predetermined value. Thus, the computing unit LO outputs a rectangular signal R12. Similarly, as illustrated in FIGS. 18A and 18B, the computing unit LO outputs a rectangular signal R13 corresponding to the difference between the first and third periodic signals. For example, the predetermined value is set at 0.1. When the difference between the maximum value and the minimum value is equal to or less than 0.1, the value of each of the signals R12 and R13 is set at 1. Otherwise, the value of each of the signals R12 and R13 is set at zero.

Figure 19A:
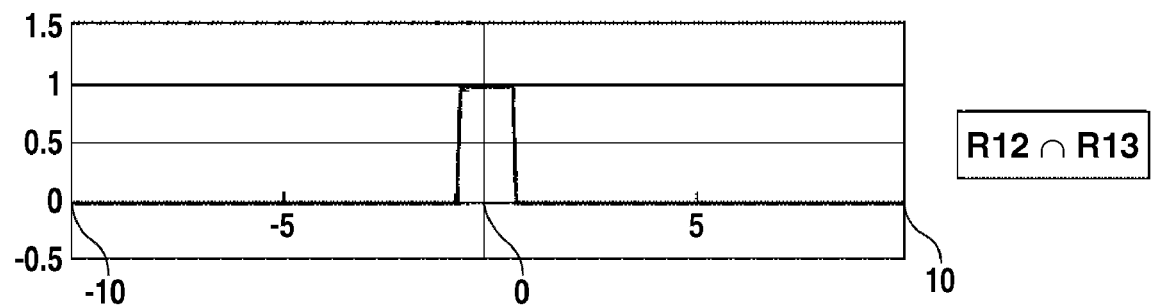
FIGS. 19A and 19B are waveform charts illustrating waveforms of rectangular signals obtained as a logical product of the rectangular signals.
Figure 19B:
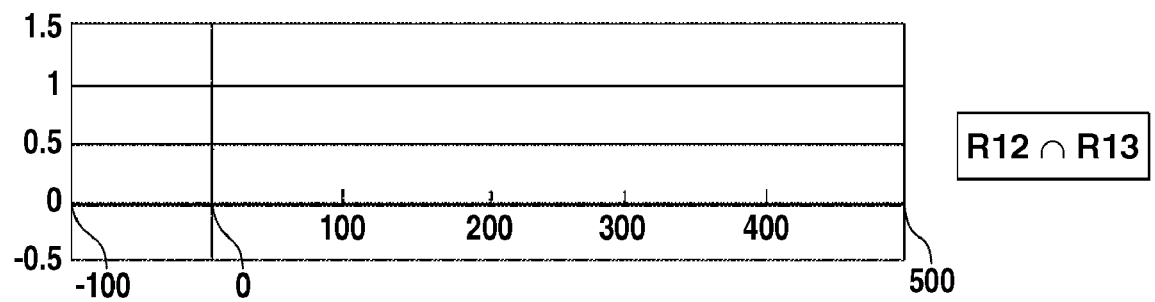

However, according to the present exemplary embodiment, the widths of the second diffraction grating portion GT2 and the third diffraction grating portion GT3 in the displacement direction of the scale and the width of light fluxes to be irradiated thereon in the displacement direction of the scale are wide, so that the attenuation of a signal is small. Thus, the rectangular signals R12 and R13 rise at the origin and at a plurality of positions on the periphery of the origin. According to the present exemplary embodiment, as illustrated in FIGS. 19A and 19B, the computing unit obtains a logical product of the rectangular signal R12 corresponding to the difference between the first and second periodic signals and the rectangular signal R13 corresponding to the difference between the first and third periodic signals. Consequently, the rectangular signals rising at positions other than the origin can be eliminated. Thus, the rectangular signal can be output as an origin signal indicating the position of the origin. The above described processing of the computing unit can be performed by calculation of a difference and a sum and calculation of the maximum value and the minimum value using a comparator or the like. Consequently, the computing unit can execute the above computing process with a simple circuit configuration. In addition, the computing unit can execute the computing process quickly.

The computing unit can output a more accurate origin signal by obtaining a logical product of the rectangular signal and a signal representing the positions at which the phase of the periodic signal (corresponding to, e.g., the phase V) generated by the first diffraction grating portion GT1 has a predetermined value (e.g., zero).

Thus, the origin detection apparatuses according to the exemplary embodiments of the present invention have been described by giving examples. However, the present invention is not limited to the above exemplary embodiments and can be implemented by other configurations.

In the above exemplary embodiments, the second periodic signals and the third periodic signals are set such that the amplitudes of the signals decrease as a distance from the origin increases. Alternatively, the second periodic signals and the third periodic signals can be set such that the amplitudes of the signals increase as the distance from the origin increases. In this case, the second and third diffraction grating portions are not formed in the vicinity of the origin but formed at other portions. According to the present invention, the amplitude of the signal in the vicinity of the origin differs from that of the signal at another part. Thus, the origin is identified. Accordingly, it suffices for determining the origin to set the periodic signal to have an extremal value.

Figure 20:
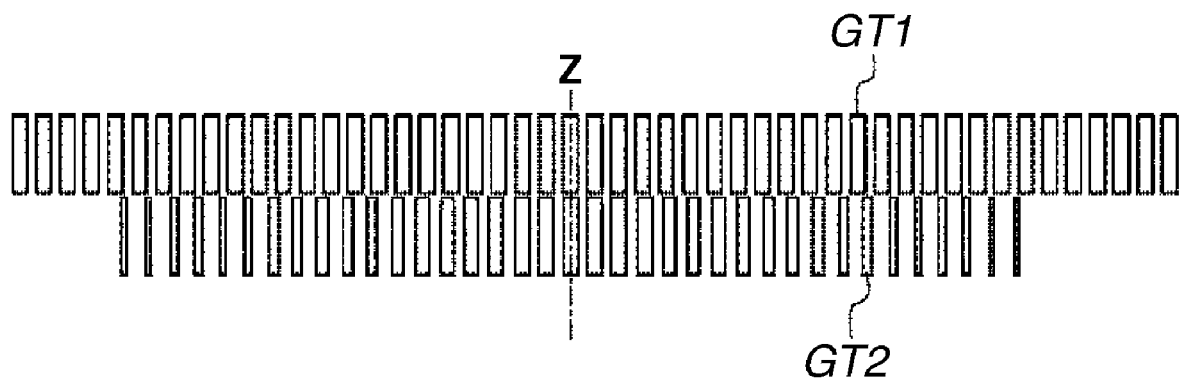
FIG. 20 is a schematic diagram illustrating another example of a second diffraction grating portion formed on a scale according to an exemplary embodiment of the present invention.

According to the above exemplary embodiments, in order to set the second and third periodic signals such that the amplitude of the signal decreases with increase in the distance from the origin, the width of the diffraction grating portion is narrowed. However, the setting of the amplitude of the signal to decrease with increase in the distance from the origin can be achieved by other methods. For example, as illustrated in FIG. 20, the slit width of each slit constituting the second or third diffraction grating portion can be set so as to be narrowed or widened with increase in the distance from the origin.

In the above exemplary embodiments, the first through third diffraction grating portions are the reflection type diffraction grating. However, the transmission type diffraction grating portions can be used. In this case, the interference light flux caused by the diffraction light fluxes of different orders of diffraction (e.g., first positive/negative order diffraction light fluxes) are received by the light receiving portion without providing the slit member, and the mirrors ML, MR, M1 through M3 in the apparatus. Thus, an origin signal is output.

In the above exemplary embodiments, the first through third diffraction grating portions are formed integrally with the scale. However, the first through third diffraction grating portions can be formed on different scales, respectively. In this case, the scales are set to move in the same direction in synchronization with one another. However, it is not easy to exactly achieve the position-adjustment of each scale. Thus, detection accuracy is enhanced by forming the diffraction grating portions integrally with the scale, as described in the present exemplary embodiments. According to the present exemplary embodiments, members common to the diffraction grating portions are used not only as the scale but as the mirrors, the slit members, the collimator lens, the light source, and the like. Accordingly, it is unnecessary to exactly achieve the position-adjustment of each other. In addition, the detection accuracy is high.

In the above exemplary embodiments, a light flux emitted from a single light source is split into a plurality of light fluxes. However, a plurality of light sources can be used.

According to the above exemplary embodiments, the first through third diffraction grating portions are formed in parallel to the displacement direction of the scale. However, the second or third diffraction grating portion can be formed in series with an end portion of the first diffraction grating portion.

According to the above exemplary embodiments, the second and the third diffraction grating portions are provided at positions including the origin. However, the second or third diffraction grating portion can be divided into two diffraction grating parts respectively and formed at both ends of the first diffraction grating portion separately from each other. For example, in a case where the second diffraction grating portion is formed by being divided into two parts, a detection error can be reduced, even when the displacement direction of the scale is not parallel to the direction of the grating of the diffraction grating portion, by averaging values of signals that are obtained by the second diffraction grating parts at both ends of the first diffraction grating portion.

In the above exemplary embodiments, the periodic signals are output as the signals having three phases U, V, and W which are shifted 120 degrees from each other. However, the periodic signals can be output as signals having two or four phases shifted 90 degrees from each other.

In the above exemplary embodiments, the origin signal obtained from the interference light fluxes generated by the two or three diffraction grating portions is output. However, an origin signal obtained from interference light fluxes generated by four or more diffraction grating portions can be output. An origin signal with higher accuracy can be output by narrowing the width of a rectangular signal obtained by computing a logical product of a plurality of rectangular signals.

The above exemplary embodiments can be used as a device (linear encoder) for measuring a linear displacement of the scale. The above exemplary embodiments can be used as a device (rotary encoder) for measuring an angular displacement of the scale configured to rotate around the center thereof. In this case, the direction of the grating of the diffraction grating portion is a circumferential direction. The slit patterns of the diffraction grating portion are formed to be arranged radially.

In addition, the grating pitches and the widths of the first through third diffraction grating portions can be set at different values or different combinations thereof.

The present invention can be applied to a device (absolute encoder) for measuring a displacement (absolute position) from the origin of the scale based on an origin signal obtained by the above described origin detection apparatus.

In addition, the origin detection apparatus or the displacement measurement apparatus according to the present invention can be applied to various electronic apparatuses, e.g., an industrial machinery stage, a high-precision shape measurement apparatus, a microscope stage, a high-precision machining apparatus, a semiconductor exposure apparatus, and a semiconductor manufacturing apparatus, which use to measure a sub-nanometer displacement. The origin detection apparatus or the displacement measurement apparatus according to the present invention can be applied to an image pickup apparatus, an electrophotographic type image forming apparatus, and an inkjet type image forming apparatus.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-031396 filed Feb. 13, 2009, which is hereby incorporated by reference herein in its entirety.

What is claimed is:

1. An apparatus comprising:
a light source;
a scale having first and second diffraction grating portions which differ from each other in a grating pitch;
a light receiving portion (RO) configured to receive first and second interference light fluxes, respectively, the first interference light flux being generated from interference of a plurality of diffraction light fluxes which exit the first diffraction grating portion, the second interference light flux being generated from interference of a plurality of diffraction light fluxes which exit the second diffraction grating portion, and to output first and second periodic signals based on an intensity of the first and second interference light fluxes, respectively; and a computing unit (LO) configured to output, based on the first and second periodic signals, an origin signal representing an origin of displacement of the scale, wherein the second diffraction grating portion is formed such that the second periodic signal has an extremal value if the scale is located at the origin, wherein each of the first and second periodic signals includes a plurality of phase signals (U, V, W) that are periodic signals of which phases are different from one another, wherein the computing unit is configured to obtain a maximum and a minimum among differences between pairs, each of the pairs being a pair of one of the plurality of phase signals of the first periodic signal and corresponding one of the plurality of phase signals of the second periodic signal and to output the origin signal based on a difference between the maximum and the minimum.

2. The apparatus according to claim 1, wherein the computing unit is configured to output a rectangular signal if the difference between the maximum and the minimum is not greater than a predetermined value, and to output the origin signal based on a logical product of a signal representing a position at which a phase of one of the plurality of phase signals of the first periodic signal has a predetermined value, and the rectangular signal.

3. The apparatus according to claim 1, wherein the first and second diffraction grating portions have respective grating lines at the origin, a region over which the second diffraction grating portion is formed being narrower than a region over which the first diffraction grating portion is formed.

4. The apparatus according to claim 1, wherein the second diffraction grating portion is formed such that a slit width thereof decreases or increases with increase of a distance from the origin.

5. The apparatus according to claim 1, wherein the scale includes a third diffraction grating portion which differs in a grating pitch from the first and second diffraction grating portions.

6. The apparatus according to claim 5, wherein the light receiving portion is configured to receive a third interference light flux, the third interference light flux being generated from interference of a plurality of diffraction light fluxes which exit the third diffraction grating portion, to receive the third interference light flux, and to output a third periodic signal based on an intensity of the third interference light flux, wherein the third diffraction grating portion is formed such that the third periodic signal has an extremal value if the scale is located at the origin.

7. The apparatus according to claim 6, wherein the third periodic signal includes a plurality of phase signals (U, V, W) that are periodic signals of which phases are different from one another, and the computing unit is configured to obtain a maximum and a minimum among differences between pairs, each of the pairs being a pair of one of the plurality of phase signals of the first periodic signal and corresponding one of the plurality of phase signals of the third periodic signal, and to output the origin signal further based on a difference between the maximum about the third periodic signal and the minimum about the third periodic signal.

8. The apparatus according to claim 7, wherein the computing unit is configured to output a rectangular signal if the difference between the maximum about the second periodic signal and the minimum about the second periodic signal is not greater than a predetermined value, and the difference between the maximum about the third periodic signal and the minimum about the third periodic signal is not greater than a predetermined value, and to output the origin signal based on a logical product of a signal representing a position at which a phase of one of the plurality of phase signals of the first periodic signal has a predetermined value, and the rectangular signal.

9. The apparatus according to claim 6, wherein the first and third diffraction grating portions have respective grating lines at the origin, a region over which the third diffraction grating portion is formed being narrower than the region over which the first diffraction grating portion is formed.

10. The apparatus according to claim 6, wherein the third diffraction grating portion is formed such that a slit width thereof decreases or increases with increase of a distance from the origin.

11. A displacement measurement apparatus for measuring displacement of a scale, the displacement measurement apparatus comprising an apparatus defined in claim 1 for outputting an origin signal that represents an origin of the displacement of the scale.

12. An electronic apparatus including a scale, the electronic apparatus comprising an apparatus defined in claim 1 for outputting an origin signal that represents an origin of displacement of the scale.

* * * * *